United States Patent [19]
Scott et al.

[11] 3,906,224
[45]*Sept. 16, 1975

[54] DUAL SPACED EPITHERMAL NEUTRON DETECTOR POROSITY LOGGING WITH ACBE SOURCE

[75] Inventors: Hubert Dunkerley Scott; Michael Paul Smith, both of Houston, Tex.

[73] Assignee: Texaco Inc., New York, N.Y.

[ * ] Notice: The portion of the term of this patent subsequent to Nov. 20, 1990, has been disclaimed.

[22] Filed: Oct. 12, 1973

[21] Appl. No.: 406,124

Related U.S. Application Data

[63] Continuation-in-part of Ser. No. 254,282, May 17, 1972, Pat. No. 3,774,033.

[52] U.S. Cl. .................. 250/264; 250/266; 250/269
[51] Int. Cl. .............................................. G01t 3/00
[58] Field of Search ............ 250/266, 264, 499, 269

[56] References Cited
UNITED STATES PATENTS

| | | | |
|---|---|---|---|
| 2,440,999 | 5/1948 | Anderson | 250/499 |
| 2,868,990 | 1/1959 | Reardon et al. | 250/499 |
| 3,400,269 | 9/1968 | Holm | 250/499 |
| 3,491,238 | 1/1970 | Allen | 250/266 |
| 3,532,884 | 10/1970 | Dewan | 250/266 |
| 3,774,033 | 11/1973 | Scott et al. | 250/266 |

Primary Examiner—Harold A. Dixon
Attorney, Agent, or Firm—T. H. Whaley; C. G. Ries; William J. Beard

[57] ABSTRACT

An illustrative embodiment of the invention includes method and apparatus for making earth formation porosity measurements in open or cased well boreholes. A relatively high intensity ($10^8$ neutrons/sec.) actinium-beryllium neutron source is used to irradiate earth formations surrounding a well borehole with high energy neutrons. As the high energy neutrons interact with the materials comprising the earth formation their energy is reduced and some having epithermal energy are deflected back into the borehole at spaced distances from the neutron source. Two epithermal energy neutron detectors spaced at different vertical distances from the neutron source and from each other are used to measure the epithermal neutron population at the different distances. The ratio of the counting rates in the two detectors may be interpreted in terms of earth formation porosity by means of a predetermined relationship.

9 Claims, 3 Drawing Figures

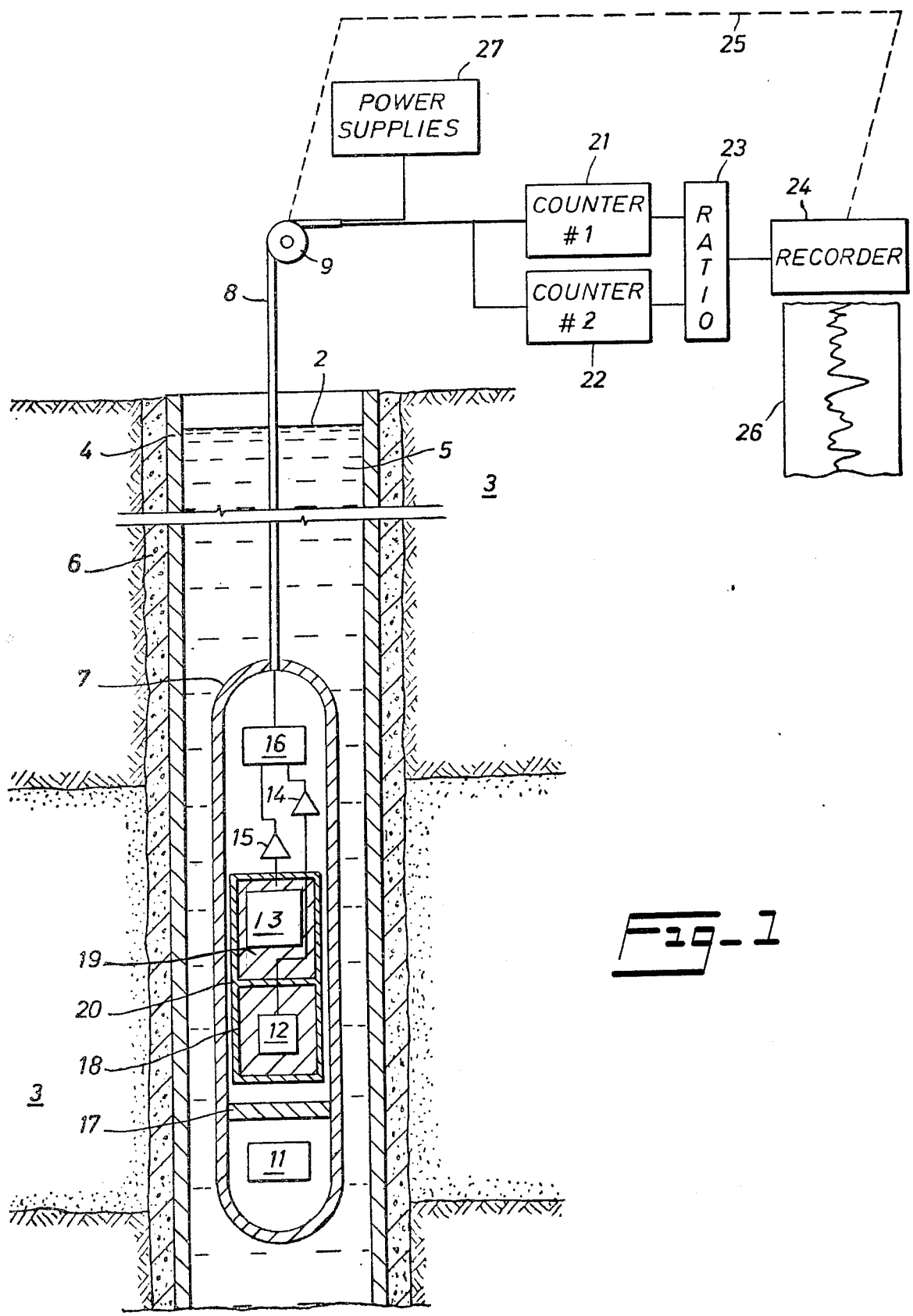

DUAL SPACED EPITHERMAL NEUTRON DETECTOR POROSITY LOGGING WITH ACBE SOURCE

This application is a continuation-in-part of copending application Ser. No. 254,282 filed May 17, 1972, and assigned to the assignee of the present invention now U.S. Pat. No. 3,774,033.

BACKGROUND OF THE INVENTION

This invention relates to radiological well logging methods and apparatus for investigating the characteristics of subsurface earth formations traversed by a borehole and more particularly to apparatus and methods for measuring earth formation porosities by means of neutron well logging techniques.

It is well known that oil and gas are more likely to be found in commercially recoverable quantities from those earth formations which are relatively porous or permeable than in more highly consolidated earth formations. Thus, equipment and methods for accurately identifying the porosity of earth formations has substantial industrial importance.

Various methods and apparatus have been proposed in the prior art for utilizing neutron diffusion through earth formations to measure porosity. Typically, proposals of this sort have suggested the use of a pressure housing sonde containing a neutron source and a pair of neutron detectors spaced at different distances from the source for transport through a borehole. The thermal neutron detectors utilized in prior art techniques have been used with both pulsed and continuous neutron sources and some combination utilizing the pulse count of the detected thermal neutrons has been related to the hydrogen content of the portion of the earth formation being subjected to the flow of neutrons from the neutron source. These methods have generally not proven to be as accurate as desirable due to the diameter irregularities of the borehole wall. The variation of the properties of different borehole fluids, the irregular cement annulus surrounding the casing in a cased borehole, and the properties of different types of steel casings and earth formations surrounding the borehole have all tended to obscure the thermal neutron measurements suggested in the prior art.

The thermal neutron population surrounding a source and detector pair sonde as proposed in the prior art can be affected by the chlorine content of the borehole fluid. Similarly other lithological factors such as the boron content of the earth formations surrounding the cased borehole affect thermal neutron populations. Measurements of thermal neutron captures are utilized in neutron lifetime logs or thermal neutron population die away logs of various types of contemplated in the prior art. The present invention, however, rather than relying on a measure of the thermal neutron population, utilizes a measurement of the epithermal neutron population by means of two spaced neutron detectors each longitudinally spaced from a neutron source having a relatively high intensity neutron flux. Special detector means are utilized in the invention to effectively discriminate against the detection of thermal neutrons as proposed in the prior art.

Thus, it is an object of the invention to provide an improved method and apparatus for measuring the porosity of earth formations.

Another object of the present invention is to provide a dual spaced epithermal neutron population measurement for obtaining a more accurate estimate of the porosity of earth formations surrounding a well borehole.

In accordance with the invention, a relatively high intensity continuous neutron source irradiates earth formations surrounding a well borehole with a flux of neutrons. A pair of epithermal neutron detectors spaced longitudinally along the axis of the well tool from each other and from the neutron source measure the intensity of the epithermal neutrons at the two differently spaced distances from the source. The ratio of the counts occurring in each of the two spaced epithermal neutron detectors are then interpreted in terms of the earth formation porosity in accordance with a predetermined relationship. The apparatus of the present invention has been found to give improved results from prior art devices in that less sensitivity to disturbing environmental parameters results from its use.

For a better understanding of the present invention, together with other and further objects, features and advantages, reference is made to the following detailed description thereof, when taken in conjunction with the appended drawings in which:

BRIEF DESCRIPTION OF THE DRAWINGS

FIG. 1 is a schematic diagram showing a well logging system in accordance with the principles of the present invention.

DESCRIPTION OF THE PREFERRED EMBODIMENTS

Figure 3:
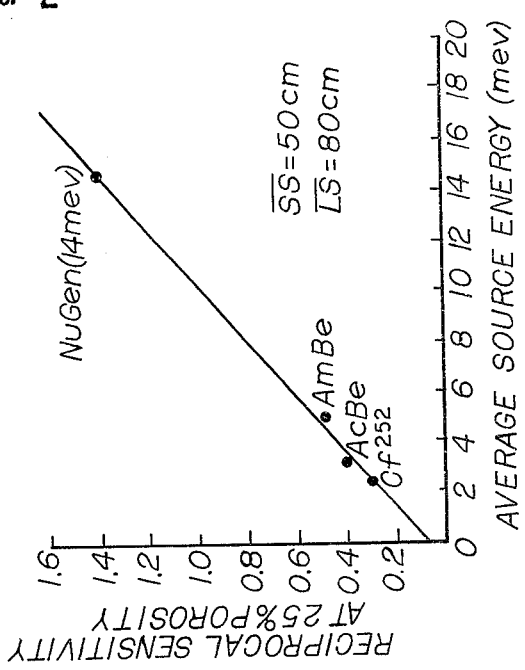
FIG. 3 is a graphical representation illustrating the reciprocal sensitivity of a well logging system in accordance with the invention in a 25 percent porosity sand for fixed detectors spacings as a function of average neutron source energy for several types of sources.

Referring initially to FIG. 1 there may be seen a simplified, schematic, functional representation in the form of a block diagram of well logging apparatus in accordance with the present invention. A well borehole 2 penetrating earth formations 3 is lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated, fluid tight, hollow, body member or sonde 7 which, during the logging operation, is passed longitudinally through the casing 4 and is sized for passage therethrough. Surface instrumentation, whose function will be discussed in more detail subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The well logging cable 8 may be of conventional armored design having one or more electrical conductors for transmitting such signals between the sonde 7 and the surface apparatus.

Again referring to FIG. 1, the sonde 7 contains a neutron source 11. One neutron source contemplated for use herein comprises a Californium 252 continuous neutron source. Such a source has the meritorious feature of producing a very high intensity of neutrons especially having an average energy of 2.3 MEV. Alternatively, an actinium beryllium neutron source having an intensity of approximately $10^8$ neutrons/sec. may be used to advantage as will be discussed in more detail subsequently. However, it will be understood by those skilled in the art that the invention is not limited to the use of a continuous neutron source. It is contemplated that a pulsed neutron source of suitable intensity could be used if desired, provided that suitable source to detector spacings are also provided. For the purposes of the preferred embodiments of the present invention, however, the high intensity of the Californium 252 or AcBe neutron sources are desirable.

Suitable radiation detectors 12 and 13 longitudinally spaced from each other and from the neutron source 11 are provided in the downhole tool. These detectors are operated as neutron detectors. In the present invention it is contemplated that detectors 12 and 13 are neutron detectors of the $He^3$ type. These are gas filled counting tubes filled with $He^3$ gas under pressure. The $He^3$ detectors respond to neutrons scattered back to the detectors 12 and 13 from the surrounding earth formations. Charge pulses established from nuclear reactions between the back scattered neutrons and the filling gas within the detectors 12 and 13 produce a satisfactory measure of the epithermal neutron population. Detectors 12 and 13 are connected to amplifiers 14 and 15 respectively which are connected to cable driving circuitry 16 for transmission of the electrical pulse signals from the detectors to the surface. Cable driving circuitry 16 may comprise, for example, an amplifier means and means for coding the pulses from the two detectors to separate them on the cable. This could be done, for example, by transmitting pulses from detectors as opposite signed electrical pulses on the cable in order that they may be distinguished and separated at the surface. Of course, other means could be used as desired. The portion of the sonde 7 between the neutron source 11 and detectors 12 and 13 is provided with a shield 17 of a neutron moderating material, for example, lucite plastic. This is provided in order to prevent the direct interaction of neutrons from the source with the two detectors since it is desired to measure the slowing down effect of the formations surrounding the borehole on the epithermal population.

Neutron detectors 12 and 13 of FIG. 1 are surrounded and enclosed by a cadmium shield 18 which is designed to screen out the entry of thermal neutrons to the interior of the detector structure. The higher energy epithermal neutrons penetrate the cadmium shield 18 more readily. Inside the cadmium shield 18 the neutron detectors are surrounded by and embedded in lucite plastic layer 19 or any other suitable high hydrogen content material.

Neutron detectors 12 and 13 of FIG. 1 are surrounded by the lucite or other high hydrogen content material in order to render them more sensitive to the epithermal neutrons which enter the detectors through the cadmium layer 18 from the earth formations surrounding the borehole. The cadmium layer surrounding the lucite shield is approximately 0.020 inches in thickness which is adequate to effectively attenuate the thermal neutron flux entering the detectors from the borehole. Moreover, the detectors are spaced from the Californium 252 neutron source at an optimum distance to provide good counting statistics. The short spaced neutron detector 12 is preferably sized about 1 inch in diameter and has about 4 inches of effective sensitive length and contains $He^3$ at 1 atmosphere pressure. The long spaced detector 13 is sized about 2 inches in diameter, about 4 inches in effective sensitive length and contains $He^3$ at about 8 atmospheres pressure. Using a 700 microgram Californium 252 neutron source which emits about $1.69 \times 10^9$ neutrons per second, it has been found that optimum source to detector spacings for these detectors are approximately 19 inches from the source to the center of the short spaced $He^3$ detector 12 and approximately 31 inches spacing from the center of the source to the center of the long spaced $He^3$ detector 13. These dimensions are applicable with the detectors configured as shown in the drawing of FIG. 1 when surrounded by the cadmium sleeve 18. The portion of the cadmium sleeve 18 interposed between the two detectors, as shown at 20 of FIG. 1, serves to limit the solid angle responses of the detectors to the approximate borehole level opposite each detector.

In the configuration shown in FIG. 1 for the neutron detectors, it has been found that the epithermal neutron count rate is reduced by about a factor of 4 when the detectors are surrounded by the cadmium sleeve 18 as illustrated, from the count rate obtained with the same $He^3$ detectors not surrounded by the cadmium sleeve. This reduction in count rate would render the spacing from the source to detector too great to obtain good counting statistics when used with a lesser intensity neutron source than the Calfornium 252 or the actinium-beryllium source. Moreover, it will be noted that the sensitivity of the neutron detectors 12 and 13 are unequal as the short spaced detector 12 contains $He^3$ at 1 atmosphere of pressure while the long spaced detector contains $He^3$ at 8 atmospheres pressure. Other pressures can be used with the AcBe source as will be described. Since the rate of epithermal neutron interaction with the $He^3$ in the detectors is proportional to the pressure or density of the $He^3$ material in the detectors, the longer spaced detector is more sensitive for a given cross-sectional area than the short spaced detector. This cooperative arrangement is also optimized for the use of the $1.69 \times 10^9$ neutron/sec. Californium 252 neutron source in the configuration shown. It will be appreciated by those skilled in the art that other source-detector spacings of optimum design could be used with other neutron sources, if desired, and still remain within the inventive concepts of the present invention. Other dimensions, for example, are given subsequently for use with the AcBe neutron source.

Figure 2:
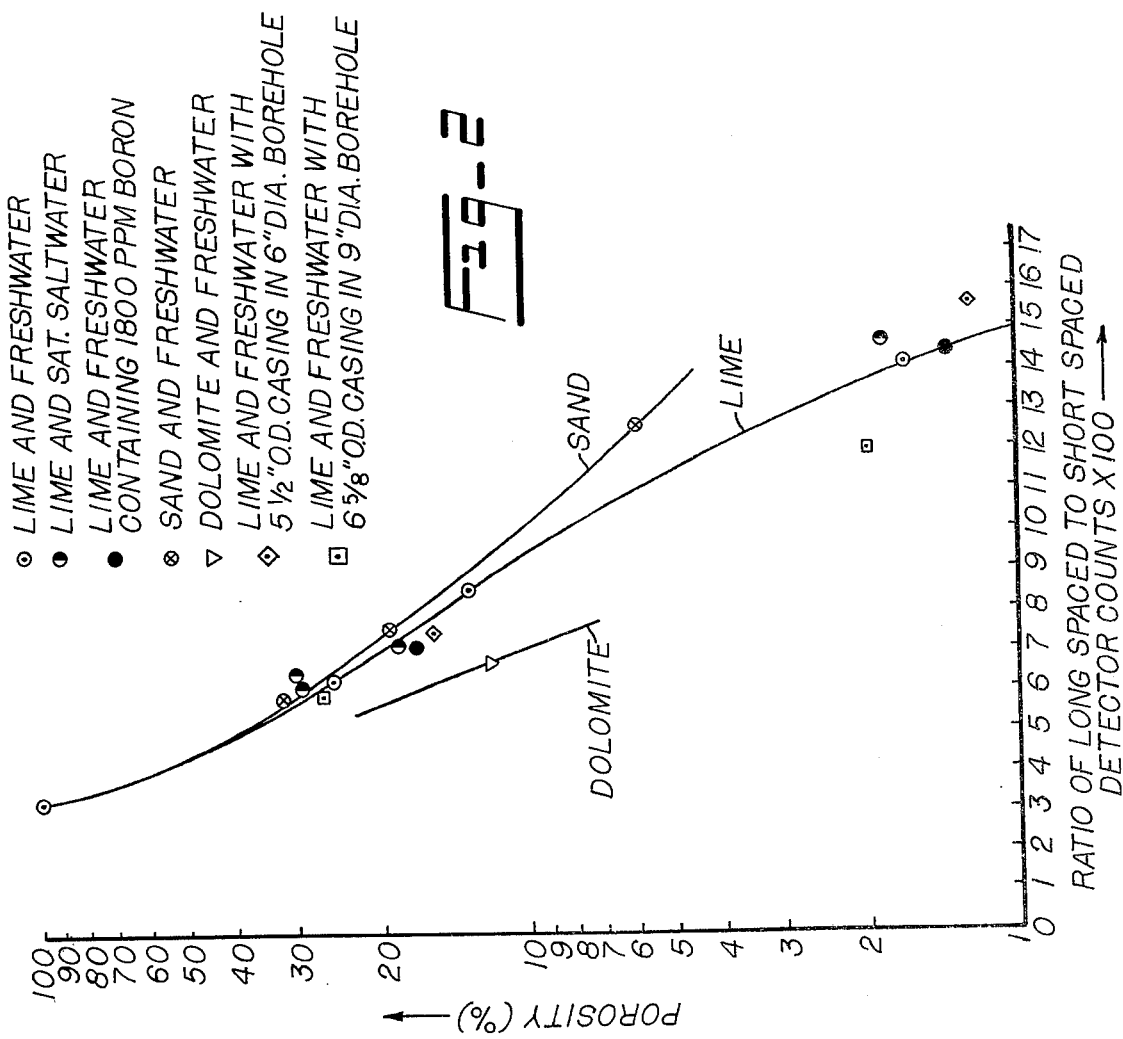
FIG. 2 is a graph illustrating the relationship between the ratio of the counts in the two epithermal neutron detectors of a well logging system such as that of FIG. 1 to the porosity of earth formations surrounding a borehole.

In any event, voltage pulses from the neutron detectors 12 and 13 are amplified by the amplifiers 14 and 15 as previously discussed and transmitted to the surface via the well logging cable 8 and cable driver circuits 16. At the surface, circuitry is shown schematically in block diagram form for interpreting the ratio of the counts in each of the two spaced neutron detectors and for recording a log of this ratio. Logs of the count rates from the individual detectors could also be made if desired. Signals from the upper or longer spaced detector which may be encoded in any manner desired as previously described, are detected as counts in the counter 21. Counts from the short spaced detector 12 are detected in a second counter 22. Counters 21 and 22 may be of any of the well known types of digital or proportional analog counters known in the art. Outputs from counter 21 and counter 22 are sampled and supplied into a ratio circuit 23 which produces an output signal proportional to the ratio of counts of the long spaced detector 13 divided by the counts occurring in short space detector 12. The relationship of this counts ratio is shown in FIG. 2 as a function of formation porosity for three different types of formations in cased borehole. It will be observed from FIG. 2 that the higher the counts ratio of the counts in the long spaced to the short spaced detector the less is the porosity of the formations surrounding the borehole. This is due to the phenomenon that a high porosity formation will generally contain more hydrogen bearing compounds such as oil or water in its pores and will therefore more rapidly attenuate the neutron flux emanating from the neutron source 11 than a lower porosity formation. The dual spaced epithermal neutron log of the present invention makes an accurate measure of the hydrogen index of the formation. The hydrogen index is defined as the quantity of hydrogen per unit volume of formation.

The output signals from the detectors 12 and 13 in the downhole tool, when taken in ratio form by the ratio circuit 23 which may be of conventional analog or digital design, are supplied to a recorder 24, which as indicated by dotted line 25, is driven either electrically or mechanically by the sheave wheel 9 as a function of borehole depth. Thus, a record is produced on a record medium 26 of a continuous recording of the ratio of counts of the long spaced to short spaced detector as a function of borehole depth. This ratio may be interpreted as illustrated by FIG. 2 in terms of porosity of the earth formations surrounding the borehole. If desired, of course, the scale of the log 26 may be calibrated directly in terms of porosity units if desired.

It will be understood by those skilled in the art that the power supply circuits 27 may be used to furnish electrical power for the downhole portion of the equipment via the well logging cable 8 and that downhole power circuits (not shown) are utilized to power the electronic circuitry shown in the downhole tool.

Although the sonde 7 shown in the drawing of FIg. 1 is suspended freely in the borehole 2, characteristics of the earth formation surrounding the borehole and the borehole environment itself, may make it advisable to centralize the housing of the sonde 7 within the borehole by means of bow springs or the like (not shown). Alternatively, a backup pad (not shown) can be used to urge the housing of the tool against the borehole wall. However, with the operating parameters as described herein for the source to detector spacing, the source composition, and intensity and the geometry shown in the drawing of FIG. 1 minimum sensitivity to borehole diameter, position, or salinity of borehole fluid has been found when performing the porosity log of the present invention. It has also been found that at low porosities the corrections for lithology between sandstones and limestones of the formation are smaller than that which would be required where detectors are set up to detect thermal neutrons in the manner suggested in the prior art. Similarly, the apparatus as shown and described minimizes the effect of neutron absorbers such as boron in low porosity formations surrounding the borehole.

Boron, a strong thermal neutron absorber, is an indicator of formation shaliness. Thus, the prior art thermal neutron logs for porosity can be affected by the presence of shale to spuriously indicate high porosity. This effect is compounded because such logs will also react to bound water held in shales which is not a true porosity indicator. Since the dual spaced epithermal neutron log is relatively unaffected by boron, the present invention can provide a more accurate determination of hydrogen index in shaly formations than those of the prior art.

In order to obtain sufficient epithermal neutrons to obtain good counting statistics, a strong neutron source such as the $1.69 \times 10^9$ neutron/sec. Californium 252 source or the $10^8$ neutrons/sec. actinium-beryllium source of the present invention is necessary. Also because the Californium 252 source emits most of its neutrons in the 2.53 MEV range this is more conducive to thermal and epithermal measurements than a higher energy source, since the neutrons do not have to be slowed as much to reach thermal or epithermal energy.

Measurements made with the apparatus and using the methods of the present invention have been found to give a useful quantitative measurement of the hydrogen index (that is, the amount of hydrogen per unit of volume) which is present in the formations surrounding the borehole. Moreover, the relatively close center-to-center spacing of the detectors gives accurate bed boundary definitions making the measurement of porosity through the casing in a cased well feasible for secondary completion operations in the well, if desired.

The Californium 252 source previously described has several desirable features for porosity logging as described, however it also has some shortcomings. For one, the initial cost of $Cf^{252}$ is relatively high because it must be produced in nuclear reactors and is thus available only in relatively small amounts. Also, for well logging use outside the United States, fissionable sources such as $Pu^{238}$ material is banned by law from commercial export. Thus it becomes commercially desirable to provide a dual spaced epithermal neutron porosity log using a cheaper, more relatively available and exportable neutron source material. In addition to its high initial cost, $Cf^{252}$ also has the relatively short effective half-life (for commercial use) of 2.65 years. In the present invention, therefore, these shortcomings are overcome by performing a dual spaced epithermal neutron porosity well log in the manner previously described with the use of a relatively high intensity actinium-beryllium neutron source. The AcBe neutron source has an effective half-life of 21.2 years. Moreover, such a source produces a neutron intensity of approxmately $10^8$ neutrons/sec. in a source whose physical size is a cylinder only 15 mm. in diameter having a height of 15 mm. This is much smaller (and hence better approximates a point source) than other available neutron sources. For example a $10^7$ neutron/sec. americium beryllium source has a 3 inch length $\times$ 1 inch diameter cylinder, and a $10^8$ neutron/sec. $Pu^{238}Be$ source is also this size.

In addition to these advantages of cost, half-life and size the AcBe neutron source offers other advantages, particularly suitable for dual spaced epithermal neutron porosity logging. In order to properly understand these it will be necessary to define several terms which are indicative of the performance of a dual detector porosity well logging system. The first such term will be referred to as the porosity resolution $\Delta\phi$ of a porosity measuring system. The porosity resolution $\Delta\phi$ may be thought of as the uncertainty produced in the value of porosity $\phi$ measured by such a tool as a function of the uncertainty in the ratio of counts measured at the two spaced detectors. For best performance then it is apparent that a tool should tend to minimize this parameter $\Delta\phi$.

The statistical uncertainty (standard deviation) $\sigma$ present in a nuclear counting tool for a measurement producing $N$ counts at the detector may be shown to be proportional to the square root of the number of counts $N$ at the detector, i.e., $$\sigma = K \cdot \sqrt{N}$$

where $K$ is a proportionately constant. By elementary statistical theory it may be shown that 96 percent of all measurements will fall within the range $\pm 2\sigma$ of the mean value $N$. For practical purposes then, $\pm 2\sigma$ establishes the statistical uncertainty of a measurement and it will be assumed from here on that in speaking of uncertainties in measurements that $\pm 2\sigma$ is the uncertainty referred to.

In the calibration of a porosity logging tool such as that shown in FIG. 2 a compromise between wide dynamic range and porosity resolution $\Delta\phi$ must generally be arrived at. In this sense it is desirable to have a small $\Delta\phi$ (which implies a shallow slope line) but also it is mandatory to have adequate dynamic range to cover the porosity $\phi$, values which may generally be expected to be encountered in typical wells (which limits the slope of the response line). If we define the sensitivity $S$ of a dual spaced detector porosity tool as the logarithmetic derivative of the tool response (i.e., $R$, the ratio of counts at the two spaced detectors) with changes in porosity $\phi$, we have $$S = \frac{d(\log R)}{d\phi} = \frac{1}{R} \frac{dR}{d\phi}$$

From the previous definition of $\Delta\phi$ it will be recalled that the tool response $R$ is (for $\pm 2\sigma$ uncertainty) a function of the count rates ($C_{SHORT}$ and $C_{LONG}$) at the detectors. From these relationships then it may be shown (for $\pm 2\sigma$ accuracy) that the porosity resolution is given by the expression $$\Delta\phi = \frac{3.28}{S} \sqrt{\left(\frac{1}{C_{SHORT}} + \frac{1}{C_{LONG}}\right) \cdot \frac{1}{2\gamma}},$$

where $S$ is the tool sensitivity, $C_{SHORT}$ is the count rate at the short spaced detector, $C_{LONG}$ is the count rate at the long spaced detector and $\gamma$ is the logging time constant (i.e., the effective RC integration network time constant used to derive the measured ratio $R$ of counts at the two detectors).

By inspection of the relationship for $\Delta\phi$ and the graph of FIG. 3 it will be appreciated that some trade off between sensitivity $S$ and count rates must be made in order to minimize $\Delta 100$. Referring now to FIG. 3 it will be observed that the reciprocal sensitivity ($1/S$) is shown as a function of neutron source energy for a dual detector epithermal neutron porosity well logging system, such as that of FIG. 1, for four different types of neutron sources. The data plotted in FIG. 3 is derived from count rate ratios $R$ taken in the same 25 percent porosity limestone with epithermal neutron detectors spaced approximately 50 and 80 cm from the source respectively. It will be observed that the $Cf^{252}$ source gives the best sensitivity $S$ in this configuration. The actinium-beryllium source gives the next best sensitivity $S$, and the americium beryllium source gives the next best sensitivity. The deuteriumtritium accelerator producing 14 MEV neutrons (approximately $10^8$ neutrons/sec.) gives the least sensitivity $S$ of any of these sources (shown as NuGen point in FIG. 3).

For a given neutron intensity, however, and at a given set of detector spacings it has been found that the slight loss of sensitivity $S$ given by using the AcBe neutron source is more than compensated for (in the expression for $\Delta\phi$) by the gain in the count rate at the long spaced detector. This results in a better $\Delta\phi$ using a $10^8$ neutron/sec. AcBe source than that obtainable using a $10^8$ neutrons/sec. $Cf^{252}$ source. This result is thought to be obtained due to the fact that $Cf^{252}$ is a softer neutron source (since the average energy of $Cf^{252}$ neutrons is 2.348 MEV) than the actinium-beryllium source (having an average energy of about 3.14 MEV). The higher energy neutrons of the AcBe source have a greater slowing down (to epithermal energy) length and hence more epithermal neutrons are present at the long spaced detector from this source than from a $Cf^{252}$ source of equal initial intensity.

An additional advantage which occurs from use of the AcBe, $10^8$ neutron/sec. source is that a longer detector spacing (between the source and the near detector as well as the far detector) can be used than that which can be tolerated (for adequate counting rates) with an equal intensity $Cf^{252}$ source. This result enhances the porosity $\phi$ measurement accuracy of such a tool due to the fact that the effects of borehole size, fluids, and mudcake are made less. This result follows since by the longer spacing to the first detector the geometry of the measured volume of the formation is made farther from the borehole. In this regard it would be possible using a $10^8$ neutron/sec. AcBe source in a well logging system as shown in FIG. 1 and having a near detector comprising a 1 inch diameter, 4 inch long $He^3$ detector at 2 atmospheres pressure, and a far detector comprising a 2 inch diameter 4 inch long $He^3$ detector at 20 atmospheres pressure, to produce a log with detectors spaced at 46 cm and 76 cm from the source, which has acceptable $\Delta\phi$ at logging speeds of from 10 to 20 feet/minute. This represents a substantial improvement over other porosity logging systems currently available at reasonable expense.

The foregoing descriptions may make other alternative embodiments of the invention apparent to those skilled in the art. It is therefore the aim in the appended claims to cover all such changes and modifications as fall within the true spirit and scope of the invention.

We claim:

1. A method for measuring the porosity of earth formations in the vicinity of a well borehole comprising the steps of:

irradiating the earth formations in the vicinity of the borehole with fast neutrons from a relatively high intensity actinium-beryllium neutron source;

detecting essentially only the epithermal neutron population at a first spaced distance from said source in the borehole;

detecting essentially only the epithermal neutron population at a second different spaced distance from said source in the borehole;

discriminating against the detection of the thermal neutron population at said detectors in the borehole; and combining the epithermal neutron population measurements made at said two different spaced distances to derive an indication of formation porosity.

2. The method of claim 1 wherein the step of combining said epithermal neutron population measurements includes taking a ratio of said measurements to provide an indication of the hydrogen index of said earth formations.

3. The method of claim 1 wherein the irradiating step is performed by irradiating the earth formations in the vicinity of the well borehole with a neutron source comprising an actinium-beryllium source emitting approximately $10^8$ neutrons/sec.

4. The method of claim 3 wherein the two epithermal neutron detecting steps are performed at spaced distances of about 46 and 76 cm from said actinium-beryllium neutron source by employing cadmium wrapped $He^3$ detectors having effective sensitive centers at these distances.

5. Apparatus for measuring a porosity related characteristic of earth formations in the vicinity of a well borehole comprising:

a fluid tight body member sized for passage in a borehole and housing;

a relatively high intensity source of fast neutrons comprising an actinium-beryllium source;

a first epithermal neutron detector spaced a first longitudinal distance from said neutron source;

a second epithermal neutron detector spaced a second different longitudinal distance from said neutron source;

shielding means for discriminating against the detection of thermal neutrons at said two different spaced epithermal neutron detectors; and means responsive to signals from said epithermal neutron detectors to generate a signal related to a porosity characteristic of the earth formations in the vicinity of the borehole.

6. The apparatus of claim 5 wherein said neutron source comprises an actinium-beryllium source capable of emitting approximately $10^8$ neutrons/sec.

7. The apparatus of claim 6 wherein said first epithermal neutron detector is spaced with its effective sensitive center 46 cm from the effective center of said neutron source and said second epithermal neutron detector is spaced with its effective sensitive center approximately 76 cm from the effective center of said neutron source.

8. The apparatus of claim 7 wherein said epithermal neutron detectors comprise $He^3$ neutron detectors embedded in a neutron moderating material and the whole surrounded by a thermal neutron absorbing material, said near detector comprising a detector being about 1 inch in diameter and 4 inches long and said far detector being about 2 inches in diameter and 4 inches long and said near detector containing $He^3$ at 2 atmospheres pressure and said far detector containing $He^3$ at 20 atmospheres pressure.

9. The apparatus of claim 8 wherein said $He^3$ neutron detectors are embedded in lucite plastic material and the whole is surrounded by a cadmium shield approximately 0.020 inches thick.

* * * * *